Sept. 1, 1936.  J. W. LEIGHTON  2,052,778
INDIVIDUAL WHEEL SUSPENSION
Filed March 7, 1934  2 Sheets-Sheet 1

Inventor.
John Wycliffe Leighton.
by A. J. S. Dennison
atty

Inventor.
John Wycliffe Leighton

Patented Sept. 1, 1936

2,052,778

UNITED STATES PATENT OFFICE 2,052,778

INDIVIDUAL WHEEL SUSPENSION

John Wycliffe Leighton, Port Huron, Mich.

Application March 7, 1934, Serial No. 714,369

3 Claims. (Cl. 267—20)

The principal objects of this invention are, to provide a construction for individual wheel suspension at the front end of a motor vehicle which will greatly enhance the riding qualities of a vehicle, materialy reducing the unsprung weight and thereby eliminating much undesirable vibration.

A further and important object is to devise a structure which may be very readily assembled as a unit separate from the chassis and may then be quickly assembled on to the car structure.

A still further and important object is to devise a simple form or structure which may be made at low cost and will effectively distribute the stresses due to the inequalities in road travel.

The principal features of the invention consist in the novel construction of a pair of arms pivotally connected to the vehicle frame adjacent to its centre and at the outer side thereof and extending laterally outward and rearwardly to swing freely in a vertical direction being supported by the wheels and in the co-operative arrangement of springs interposed between said arms and the vehicle frame to support the load.

In the accompanying drawings, Figure 1 is a plan view of the forward part of a vehicle frame showing the individual wheel suspension on one side.

Figure 1:
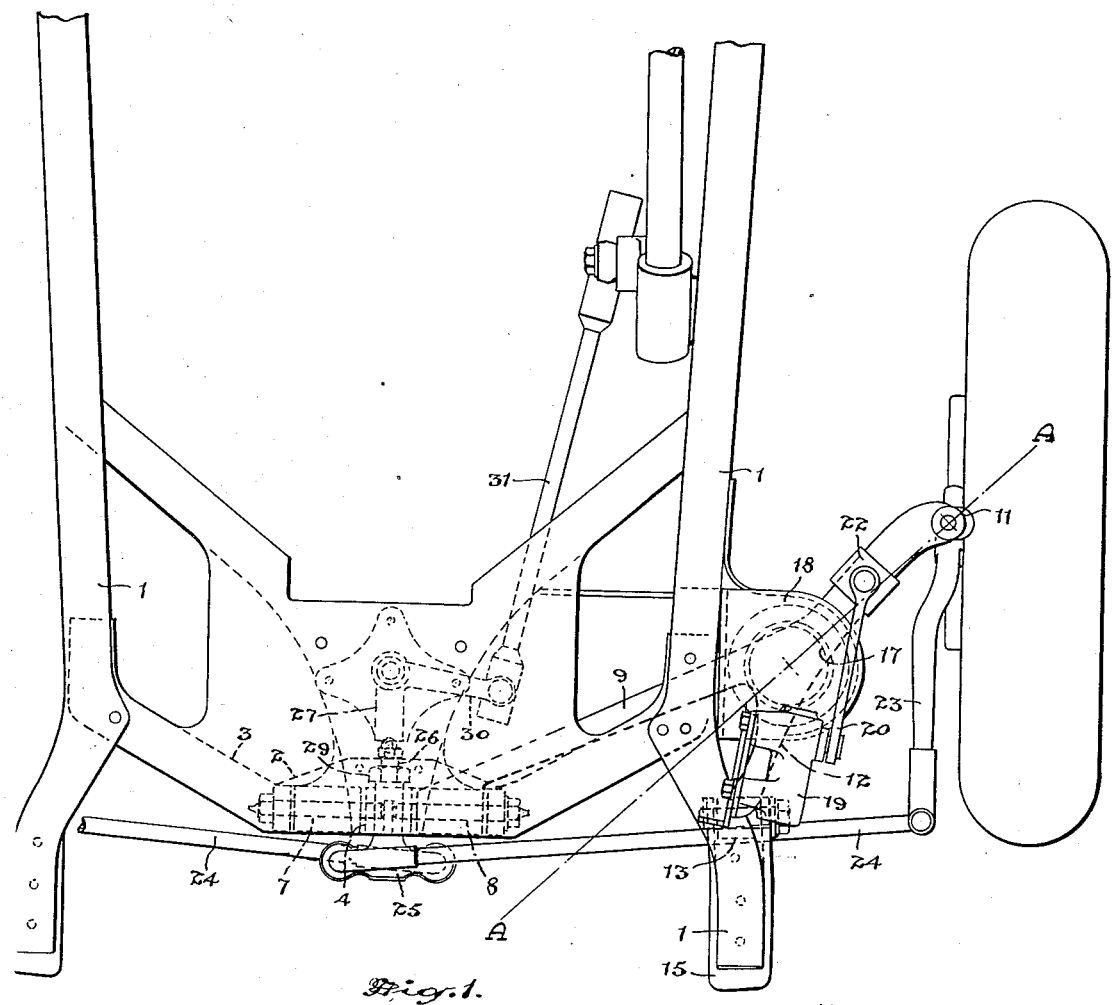
Figure 2:
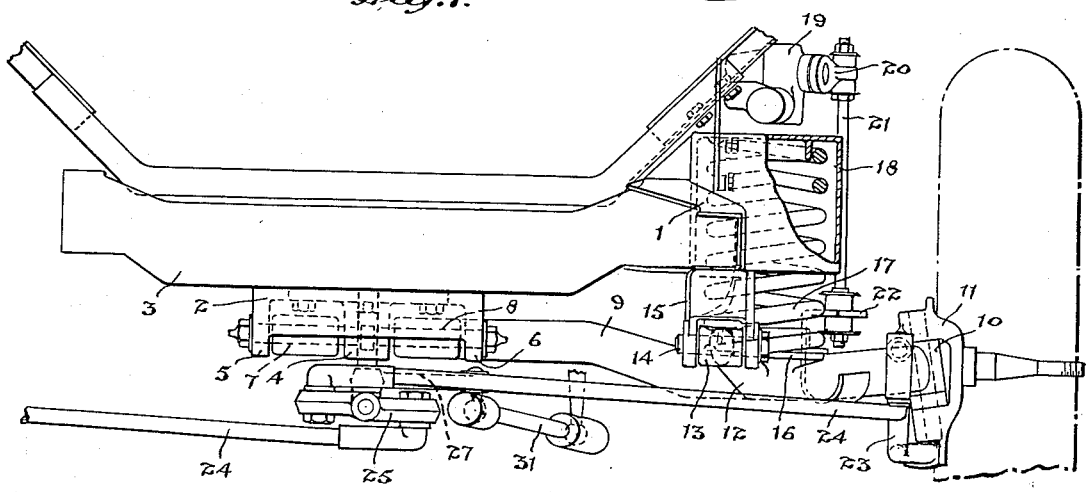
Figure 2 is a front elevational view of the structure illustrated in Figure 1.
Figure 3:
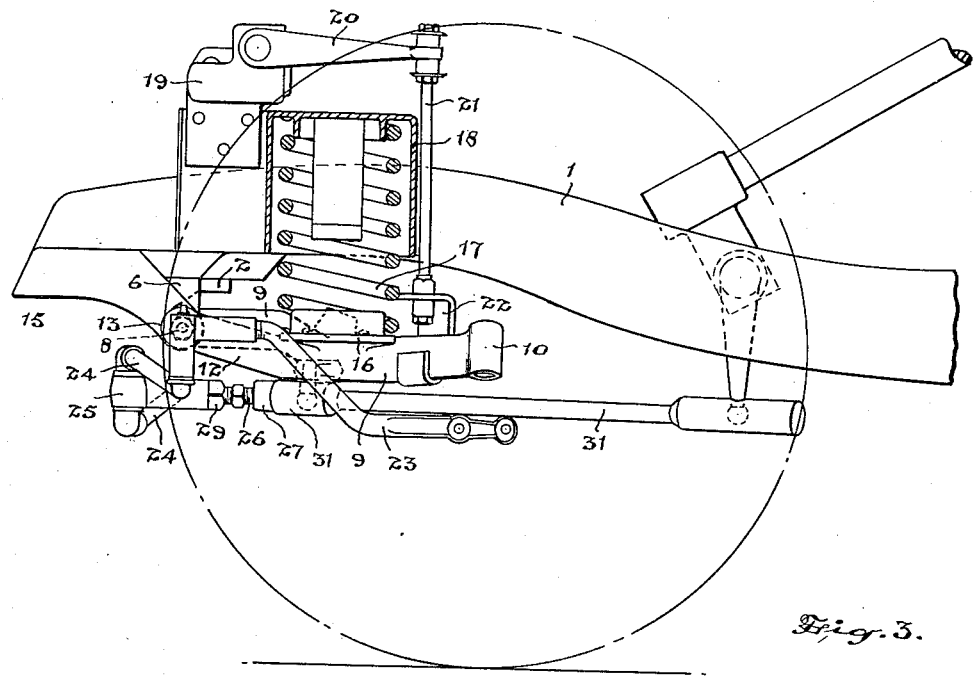
Figure 3 is a part sectional side elevational view showing the steering gear connections.
Figure 4:
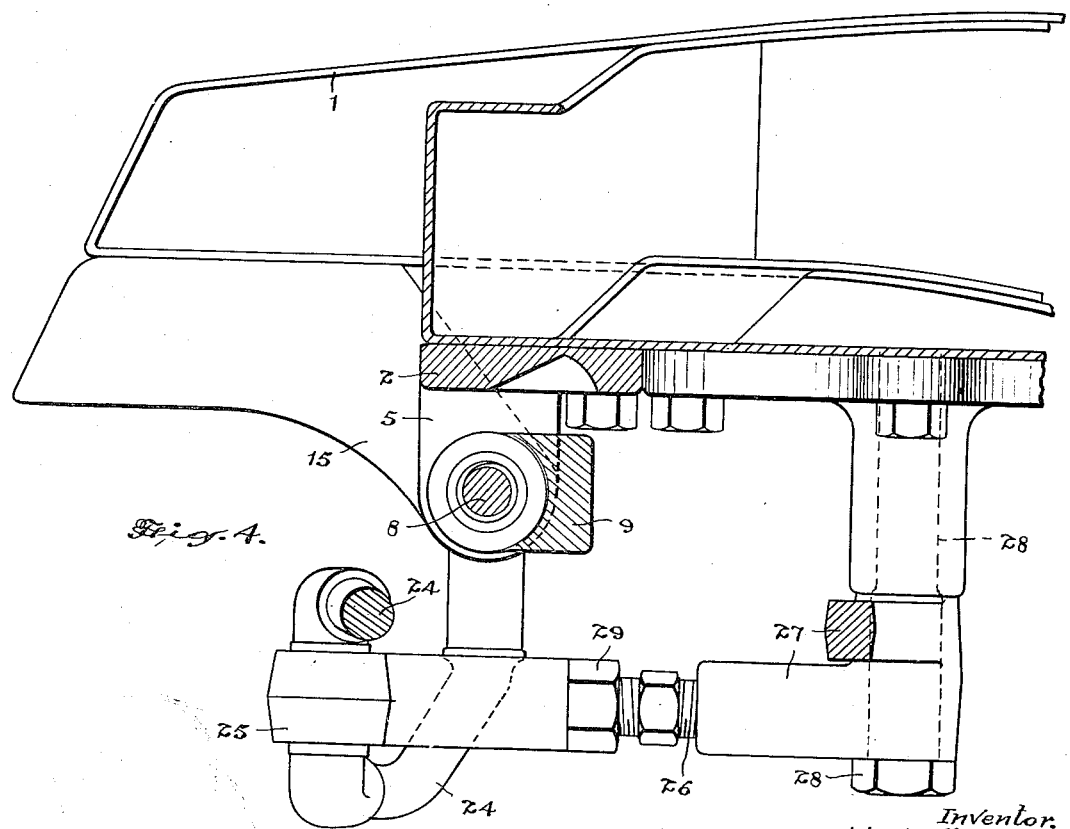
Figure 4 is an enlarged sectional and side elevational view of the swivel support of the steering connections.

The automotive industry has recently adopted the principle of individual wheel suspension for motor cars as being extremely desirable and numerous forms of mechanisms have been devised. Such mechanism is subjected to very severe stresses and shocks and it is necessary to devise a structure which will withstand a considerable amount of abuse.

In the structure herein shown the frame 1 of the vehicle is provided with a bracket member 2 arranged centrally thereof and at the forward end being rigidly secured to the cross member 3. This bracket is formed with a centre lug 4 and end lugs 5 and 6.

Threaded bearing bolts 7 and 8 are threaded through the outer lugs into the centre lug and mounted upon each of the said bolts between the centre and outside lug is an arm 9 having a threaded bearing orifice bearing on the threads of said bolt.

The arm 9 extends in a rearward and laterally outward angular direction from the bracket 2 and its outermost end projecting considerably beyond the frame is formed with a boss 10 which boss is set in an angularly upward position and carries the king pin upon which the wheel assembly 11 is mounted.

A branch arm 12 extends angularly forward from the arm 9 and its forward end 13 is in the form of a boss which is provided with a threaded orifice journalled upon the threaded bearing surface of a bolt 14 secured in a bifurcated bracket 15 connected to the forward end of the frame 1.

The axis of the bolt 14 is in alignment with the axis of the bolts 7 and 8 of the centre bracket so that the arm 9 swings on pivotal supports at the centre and outside of the frame.

A plate 16 is formed on the arm 9 at the junction of the branch arm 12 therewith and said plate forms a base for the coil compression spring 17 which extends upwardly therefrom into an inverted cup receptacle 18 rigidly secured to the frame structure.

It will be understood from this description that the arms 9 supported at the outer ends upon the wheels of the vehicle and extending inwardly and pivotally connected to the frame, support the said frame through the resilient compression springs 17 and the longitudinal shocks of impact are distributed between the centre and outside brackets through the branched structure of the arms 9.

It is important to note that the spring 17 bears downwardly on the arm at the junction of the branch 12 therewith in fulcrum contact and at a point in an angularly disposed vertical plane A—A which extends through the steering wheel pivot 11 in the one direction and between the bearing points 8 and 14 on the other side. In this way the reactive thrusts on the inward part of the arm 9 and branch 12 and their respective journals 8 and 14 will be more uniformly distributed, which is a very desirable and valuable feature in this type of transversely journalled suspension.

The vertical movement of the frame is controlled by a suitable form of hydraulic check, herein illustrated as a shock absorbing device 19 mounted on the vehicle frame and having its lever arm 20 connected by a rod 21 and shackle 22 to the arm 9.

The quick upward thrust of the arm 9 swinging on its pivot through the impact of the wheel against the irregularities in the road are absorbed by the spring 17 and the return or downward movement is checked by the member 19 and its connections with the arm 9.

The wheel assemblies 11 are each provided with a forwardly extending rod 23 rigidly connected with the king pin bracket and the forward ends of these rods which are in alignment with the axis of the centre bolts 7 and 8 and the bolts 14 have pivotally connected thereto the rods 24 which extend in to the centre of the vehicle and are each connected in a pivot bearing with a member 25, which member is adjustably mounted on a threaded bar extension 26 of a bell crank lever 27 mounted on a vertical axis 28 supported from the frame.

The threaded member 26 permits of the adjustment of the rod connection for the alignment of the wheels, said threaded member being threaded right and left hand in its adjacent members and being provided with a suitable lock nut 29.

The end 30 of the bell crank lever is connected to the drag link 31 which is operated from the steering wheel of the vehicle.

In the operation of this mechanism the arms 9 are independently pivoted at either side of the vehicle and they are free to swing up and down on their aligned pivot bolts and due to the threaded bearing surfaces between the bolts and arms there will be freedom from end play. These arms are supported on the outer ends upon the wheel assemblies and as the wheels rise and fall the arms swing upon their pivots independently, each of the springs 17 absorbing the shock and up thrust of the arms as the vehicle moves forward.

It will be readily appreciated by those skilled in the art that the use of threaded bearings in the environment claimed is of distinct importance due to the extensive end thrust surface which they present in a direction transversely of the vehicle so that the gauge of the wheels will be accurately preserved without exposing the ends of the bearing bosses to rubbing or rattling contact as would be the case with a smooth type of bearing, which would be rapidly worn by the presence of road dirt.

The support of the arms 9 at both the centre and sides of the frame permits of a very strong and rugged structure of arms and the backward slant of these arms from their pivot points to the wheel very materially eliminate transverse stresses in the arms, consequently the arms will be free from breakage, yet their position in an angular arrangement in relation to the direction of thrust will permit them to flex naturally without undue vibration.

The structure herein described is simple. It is easily assembled and easily accessible for adjustment and repair and its use provides the vehicle with an extremely flexible independent wheel suspension which will provide smooth riding qualities in the vehicle.

What I claim as my invention is:—

1. In an individual wheel suspension, the combination with a wheel assembly and a vehicle frame, of an oscillatable suspension member having an arm, supporting bearings for said arm including a threaded bearing bolt secured to the frame and arranged transversely thereof, said arm having a threaded sleeve end journalled in threaded bearing engagement with said bolt and extending laterally outward and rearwardly to swing freely in a vertical direction, the outer end of said arm having an upright pivot connection with said wheel assembly, and a spring interposed between said arm and said frame, said transversely disposed threaded bearing presenting extensive end thrust surfaces in the horizontal transverse direction of the frame and serving to accurately preserve the wheel gauge.

2. An individual wheel suspension as claimed in claim 1 in which said arm has an angular branch extension forming part of said oscillatable suspension member and terminating in a threaded sleeve axially aligned with the threaded sleeve end of said arm, and said supporting bearings include a second threaded bearing bolt secured transversely of the frame at the side thereof in threaded bearing engagement with the threaded extension sleeve.

3. An individual wheel suspension for road vehicles comprising the combination with a wheel assembly and the vehicle frame, and a forked wheel suspension member having an upright steering pivot connection with the wheel assembly at its outer end and having horizontal bearing connection with the frame at transversely spaced points in a plane extending at right angles to the longitudinal centre line of the vehicle frame and offset from the steering pivot in the longitudinal direction of the frame, of a frame suspension spring having fulcrum bearing contact with said wheel suspension member at a mean point disposed in a vertical plane which passes angularly of the longitudinal centre line of the frame in acute angular relation to the bearing pivot axis through said steering pivot in bisecting relation to the forked portions of the wheel suspension member and intermediately between said transversely spaced bearing points, whereby a more uniform distribution of the thrusts at said spaced bearing points is achieved.

JOHN WYCLIFFE LEIGHTON.